J. H. MAXWELL.
TRAP.
APPLICATION FILED MAR. 14, 1916.
1,228,802.
Patented June 5, 1917.
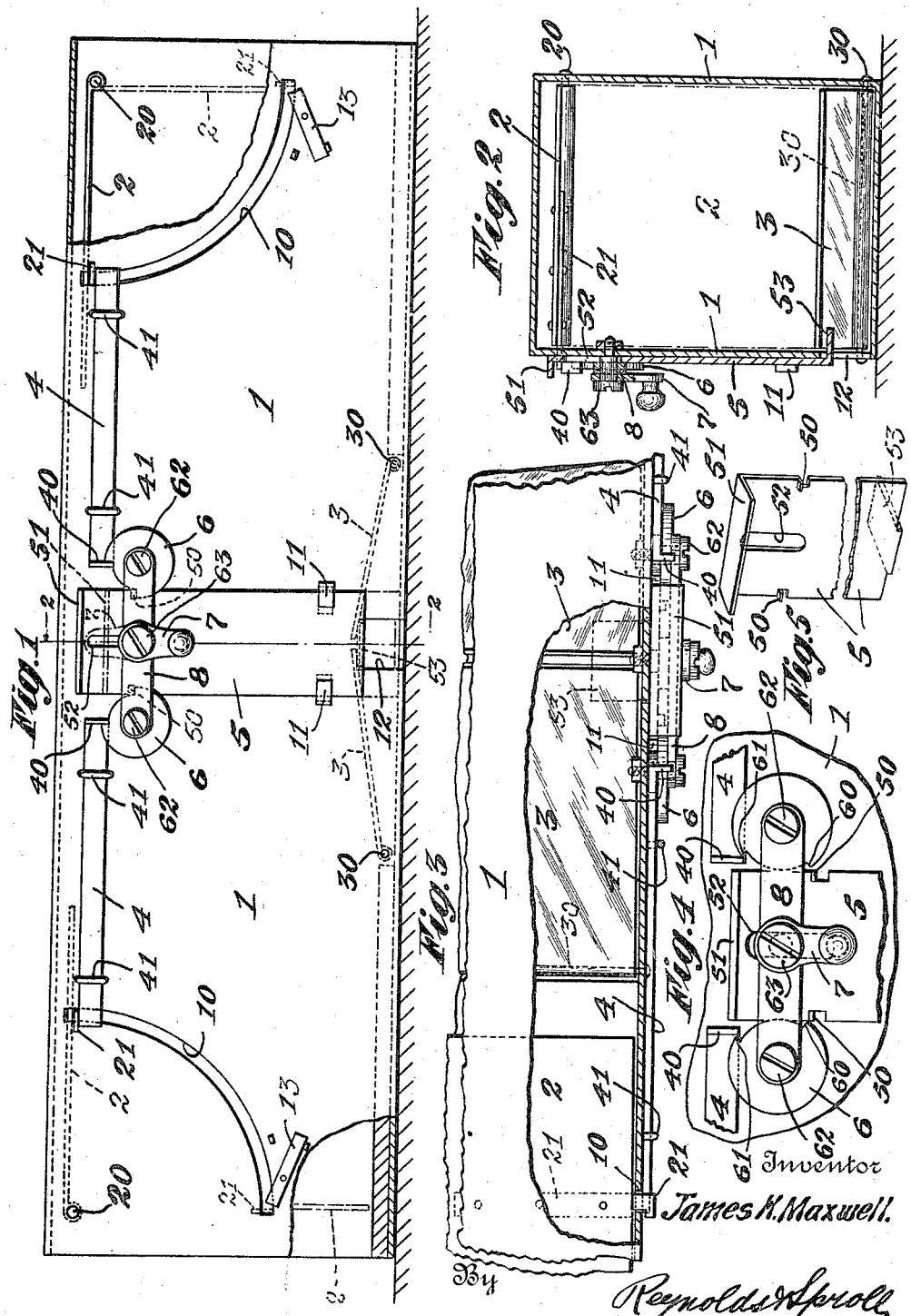
Inventor
James H. Maxwell.
By Reynolds & Sproll
Attorneys

UNITED STATES PATENT OFFICE.

JAMES H. MAXWELL, OF SEATTLE, WASHINGTON.

TRAP.

1,228,802.          Specification of Letters Patent.          Patented June 5, 1917.

Application filed March 14, 1916. Serial No. 84,222.

*To all whom it may concern:*

Be it known that I, JAMES H. MAXWELL, a citizen of the United States, and resident of the city of Seattle, county of King, State of Washington, have invented certain new and useful Improvements in Traps, of which the following is a specification.

My invention relates to traps, and consists of a trap which comprises a casing provided with openings for the entrance of animals, and means whereby after they have entered the trap the openings may be closed to retain them.

The object of my invention is to provide a trap of this general character, which may be cheaply constructed, and which will be reliable, durable and efficient. The particular features of my invention which are novel, and upon which I desire patent protection will be herein described, and then particularly defined by the claims.

In the accompanying drawings I have shown the form of construction which is now preferred by me.

Figure 1 is a side view of the trap in set position, portions of the side wall being broken away to show the interior.

Fig. 2 is a section on the line 2—2 of Fig. 1.

Fig. 3 is a fragmentary top view, with a portion of the top wall broken away to show the mechanism for operating the trap.

Fig. 4 is a side view of the trap releasing mechanism, in the position occupied when the trap is released.

Fig. 5 shows in perspective the vertically movable member, which supports the movable floor sections.

The casing of the trap is preferably made of a rectangular cross section, to form a long box open at each end, of such size as to permit the free entrance of such animals as it is intended to catch. The ends, when the trap is set, are freely open, so that an animal seeing the opening ahead of him will be more likely to enter than if the farther end of the casing were closed.

The ends are closed by means of swinging doors 2, these being hinged upon pins 20 at their upper edge, and at the upper side of the casing. When the trap is set, these doors are swung inward and upward into the position shown in Fig. 1 and Fig. 3. Each door has a laterally projecting arm 21, which extends through an arcuate slot 10 in the side of the casing.

Mounted to reciprocate under the casing is a catch bar 4, staples 41 being shown to hold this in place, and to permit longitudinal movement of the bar. One end of this bar may be slid under the projecting end of the arm 21, to thereby hold the arm raised. The other end of the catch bar 4 is adapted for connection with the tripping mechanism.

Two sections 3 of the floor are hinged, as upon pivots 30 so that they may swing vertically. The free ends of these sections meet at the center of the length of the trap, and when the trap is set are supported in raised position by means of a laterally projecting arm 53, of a vertically movable bar or plate 5. This plate 5 is preferably mounted upon the outside of the casing, and the arm 53 projects through an opening 12 in the side of the casing and extends under the swinging edges of the movable floor sections 3.

Pivoted adjacent the catch bar 4 and the vertically movable floor supporting bar 5, is a bell-crank member 6. This member as herein shown is in the form of a disk, although the disk form is immaterial. This member is provided with faces or teeth 60 and 61, one adapted for engagement with the vertically movable bar 5, and the other for engagement with a laterally projecting arm 40 of the catch bar 4. The engagement of the bar 5 is preferably by means of a laterally projecting lug 50.

If the doors 2 are swung upward and bars 4 pushed outward to enter beneath the arms 21, the bar 5 will be raised and the trap will be in the position shown in Fig. 1, in which it is set. With the weight of the parts properly adjusted, friction produced by the weight of the door upon the bar 4 will be sufficient to support the floor supporting bar 5, and the floor sections 3. If however, an additional weight as the foot of an animal, be placed upon the rod 3, the bar 4 will be withdrawn, permitting the doors 2 to fall, thus securing the animal in the trap. I may employ a catch to secure the door in closed position. As herein shown this consists of a lever 13, pivoted nearer one end than the other, and so placed as to permit the passage of the arms 21 in closing, and to prevent their reverse passage.

To retain the bar 5 in position, and to constitute guides therefor, ears 11 may be punched out of the material forming the side of the casing, and the bar 5 placed behind these.

The pivots 62 upon which the bell crank members 6 are mounted, also form the supports for a bar 8, which extends across the upper end of the bar 5. As a convenience in setting the trap, a setting catch 7 may be used, this consisting of a short bar pivoted upon the transverse bar 8, and adapted, when thrown in upper position, to engage the side projecting flange 51 of the bar 5 and hold this raised, while the trap is being set.

While I have herein described the parts constituting one end entry of the trap, it will be understood that the duplication of these to make the trap double ended, as has been shown, is only a duplication of parts.

What I claim as my invention is:

1. In an animal trap, in combination, a casing having an entrance opening, a door for closing said opening hinged by its upper edge to swing upwardly, an arm extending from a side of the door, the casing having an arcuate slot permitting the exterior projection of said arm, a catch bar mounted on the exterior of the casing and movable to supportingly engage and to disengage said arm, a vertically movable floor section, a movable supporting member for said floor section, and a bell crank member pivoted adjacent the floor supporting member and a catch bar, said latter members each having offset portions adapted to engage the arms of the bell-crank connecting member.

2. In an animal trap, in combination, a casing having an entrance opening, a door for closing said opening hinged by its upper edge to swing upwardly, an arm extending from a side of the door, the casing having an arcuate slot permitting the exterior projection of said arm, a catch bar mounted for longitudinal reciprocation horizontally in position to enter beneath the outwardly projecting arm of the door, the end of said catch bar having a side projecting arm, a bell-crank member pivoted upon the casing and having an arm engaging the side projecting arm of the catch bar, a vertically movable floor section, and a bar mounted for vertical movement on the casing having a side arm supporting the movable floor section, and an actuating engagement with the other arm of the bell-crank member.

3. In an animal trap, in combination, a casing having an entrance opening, a door for closing said opening hinged by its upper edge to swing upwardly, an arm extending from a side of the door, the casing having an arcuate slot permitting the exterior projection of said arm, a catch bar mounted for longitudinal reciprocation horizontally in position to enter beneath the outwardly projecting arm of the door, the end of said catch bar having a side projecting arm, a bell-crank member pivoted upon the casing and having an arm engaging the side projecting arm of the catch bar, a vertically movable floor section, and a bar mounted for vertical movement on the casing having a side arm supporting the movable floor section and an actuating engagement with the other arm of the bell-crank member, the upper end of said floor supporting bar having a side projecting flange, and a setting catch adapted to engage said flange to hold the bar raised.

4. In an animal trap, in combination, a casing having an entrance opening, a door for closing said opening hinged by its upper edge to swing upwardly, an arm extending from a side of the door, the casing having an arcuate slot permitting the exterior projection of said arm, a catch bar mounted for longitudinal reciprocation horizontally in position to enter beneath the outwardly projecting arm of the door, the end of said catch bar having a side projecting arm, a bell crank member pivoted upon the casing and having an arm engaging the side projecting arm of the catch bar, a vertically movable floor section, and a bar mounted for vertical movement on the casing having a side arm supporting the movable floor section, and an actuating engagement with the other arm of the bell-crank member, and a locking member positioned to project into said arcuate slot, and adapted to secure said door in closed position.

Signed at Seattle, Washington, this 6th day of March, 1916.

JAMES H. MAXWELL.

Copies of this patent may be obtained for five cents each, by addressing the "Commissioner of Patents, Washington, D. C."